United States Patent
Ishibashi et al.

(10) Patent No.: US 10,245,953 B2
(45) Date of Patent: Apr. 2, 2019

(54) DISPLAY DEVICE

(71) Applicant: TOYOTA JIDOSHA KABUSHIKI KAISHA, Toyota-shi, Aichi-ken (JP)

(72) Inventors: Masahisa Ishibashi, Nisshin (JP); Yasutaka Yoshimura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 119 days.

(21) Appl. No.: 15/425,093

(22) Filed: Feb. 6, 2017

(65) Prior Publication Data

US 2017/0274772 A1   Sep. 28, 2017

(30) Foreign Application Priority Data

Mar. 22, 2016   (JP) ................. 2016-057324

(51) Int. Cl.
  *B60K 35/00*   (2006.01)
  *G06T 11/00*   (2006.01)
  *G06T 11/20*   (2006.01)

(52) U.S. Cl.
  CPC ............ *B60K 35/00* (2013.01); *G06T 11/001* (2013.01); *G06T 11/206* (2013.01); *B60K 2350/106* (2013.01); *B60K 2350/1076* (2013.01); *B60K 2350/1092* (2013.01); *B60K 2350/2008* (2013.01); *Y02T 10/84* (2013.01)

(58) Field of Classification Search
  CPC ............... B60L 11/1809; B60K 35/00; B60K 2350/2008; G07F 15/005
  See application file for complete search history.

(56) References Cited

U.S. PATENT DOCUMENTS

2015/0151642 A1   6/2015   Suzuki et al.
2015/0258998 A1   9/2015   Kusumi et al.

FOREIGN PATENT DOCUMENTS

| JP | 2009-238030 A | 10/2009 |
| JP | 2013-038933 A | 2/2013 |
| JP | 2013-085335 A | 5/2013 |
| JP | 2014-039409 A | 2/2014 |
| JP | 2014-069593 A | 4/2014 |
| JP | 2014-086030 A | 5/2014 |
| JP | 2015-012674 A | 1/2015 |

*Primary Examiner* — Matthew Salvucci
(74) *Attorney, Agent, or Firm* — Oliff PLC

(57) ABSTRACT

A display displays a charging schedule of an electricity storage device, using multiple icons representing charging plans for multiple days. When multiple charging reservation types are specified for charging plans for multiple days, a controller displays icons on the display so that at least one of shapes and colors of the icons are different for each charging reservation type.

13 Claims, 4 Drawing Sheets

DISPLAY DEVICE

BACKGROUND

1. Technical Field

The present disclosure relates to a technique for displaying a charging schedule of an electricity storage device.

2. Description of Related Art

In an electric vehicle or a plug-in hybrid vehicle comprising an electric motor for generating vehicle drive power and an electricity storage device for supplying electricity to the electric motor, the electricity storage device can be charged with electricity from an external power supply, such as a commercial power supply. Patent Document 1 discloses a technique in which expected charging start time is computed based on scheduled charging finish time set by a user, the expected charging start time is displayed on the display device in the vehicle, and charging is started at the expected charging start time.

[Patent Document 1] Japanese Unexamined Patent Application Publication No. 2013-85335

Displaying a charging schedule for multiple days, such as one week, on a single screen may improve a user's convenience. However, only with a charging schedule for multiple days displayed on a screen, it is difficult to intuitively understand which charging reservation type is set to each charging plan when there are multiple charging reservation types.

SUMMARY

The embodiments have been made in view of such a situation, and a purpose thereof is to provide a technique for enabling a user to intuitively understand which charging reservation type is set to each charging plan while displaying a charging schedule for multiple days.

To solve the problem above, a display device of one embodiment comprises: a display configured to display a charging schedule of an electricity storage device, using a plurality of icons representing charging plans for a plurality of days; and a controller configured to display, when a plurality of charging reservation types are specified for the charging plans for the plurality of days, the icons on the display so that at least one of shapes and colors of the icons are different for each of the charging reservation types.

According to the embodiment, since icons are displayed on the display so that at least one of shapes and colors of the icons are different for each charging reservation type, the charging reservation type set to each charging plan can be intuitively understood while a charging schedule for multiple days is displayed.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Various embodiments will now be described by reference to the drawings. The embodiments are illustrative and are not intended to be limiting.

Figure 1:
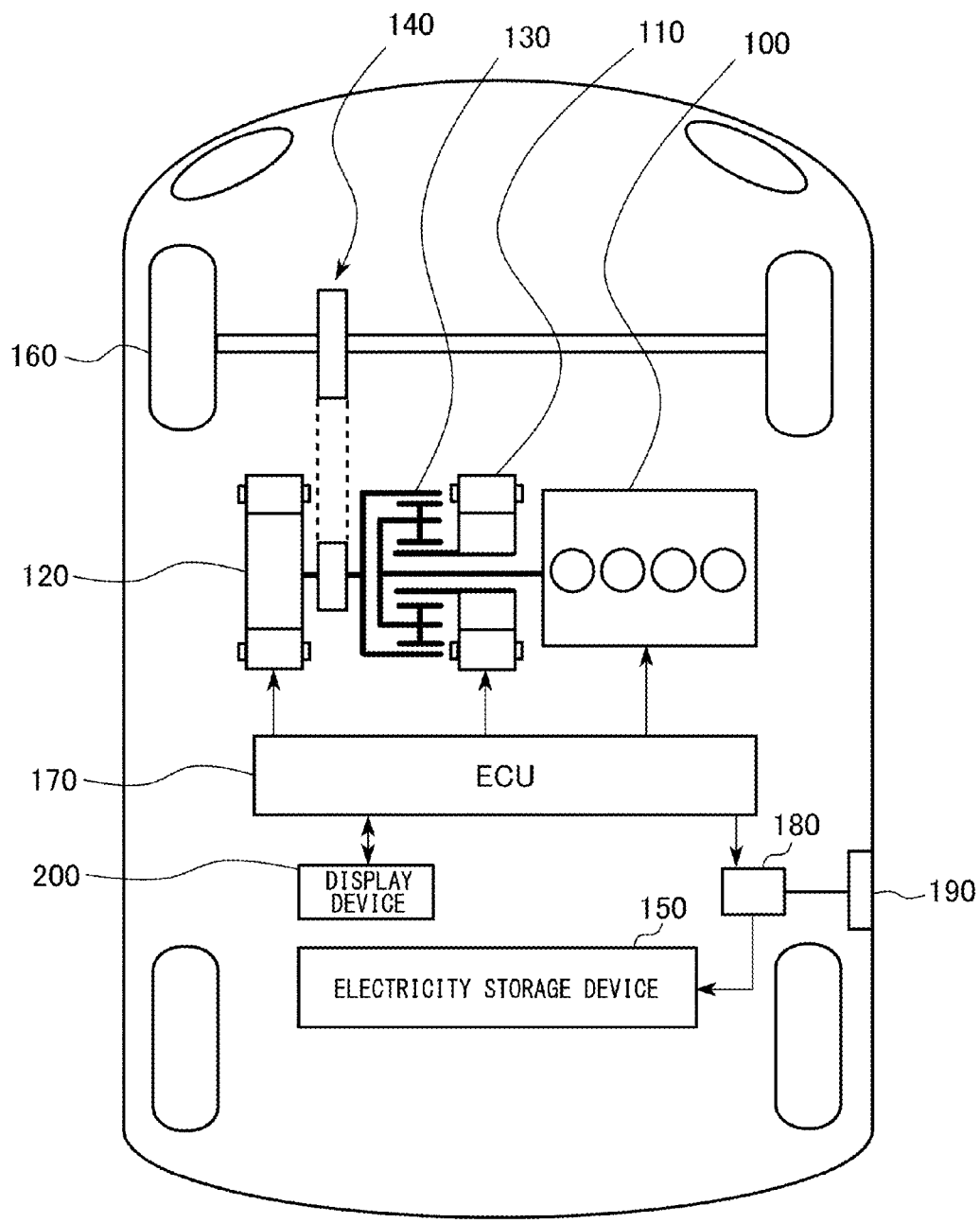
FIG. 1 is a block diagram that shows a schematic configuration of a hybrid vehicle according to an embodiment.

FIG. 1 is a block diagram that shows a schematic configuration of a hybrid vehicle 1 according to an embodiment. The hybrid vehicle 1 comprises an engine (internal-combustion engine) 100, a first electric motor (MG: Motor-Generator) 110, a second electric motor 120, a power split device 130, a reducer 140, an electricity storage device 150, drive wheels 160, an electronic control unit (ECU) 170, a charger 180, a charge inlet 190, and a display device 200.

The engine 100, first electric motor 110, and second electric motor 120 are connected to the power split device 130. The hybrid vehicle 1 is driven by drive power provided from at least one of the engine 100 and the second electric motor 120. The drive power generated by the engine 100 is divided between two systems by the power split device 130: one is a system by which the drive power is transmitted to the drive wheels 160 via the reducer 140; and the other is a system by which the drive power is transmitted to the first electric motor 110.

The first electric motor 110 generates electricity using the drive power provided from the engine 100 and divided by the power split device 130. More specifically, when the residual capacity {hereinafter, referred to as "state of charge (SOC)"} of the electricity storage device 150 is low, the engine 100 is started and the first electric motor 110 generates electricity. With the electricity generated by the first electric motor 110, the electricity storage device 150 is charged.

The second electric motor 120 generates drive power using at least one of the electricity stored in the electricity storage device 150 and the electricity generated by the first electric motor 110. The drive power generated by the second electric motor 120 is then transmitted to the drive wheels 160 via the reducer 140.

During braking of the vehicle, for example, the drive wheels 160 drive the second electric motor 120 via the reducer 140, so that the second electric motor 120 operates as a power generator. Namely, the second electric motor 120 operates as a regenerative braking system for converting braking energy into electricity. Accordingly, with the electricity generated by the second electric motor 120, the electricity storage device 150 is charged.

The electricity storage device 150 is a rechargeable DC power supply, including a nickel-metal hydride battery, a lithium-ion battery, and other secondary batteries. The electricity storage device 150 stores electricity used to drive the second electric motor 120. Besides the electricity generated by the first electric motor 110 and the second electric motor 120, electricity supplied from a power supply outside the vehicle (hereafter, referred to as an external power supply) is also stored in the electricity storage device 150, as will be described later. Charging an electricity storage device with an external power supply will be referred to as external charging. As the electricity storage device 150, a high-capacity capacitor may also be used.

The ECU 170 switches the driving mode between an EV mode and an HV mode, based on the SOC of the electricity storage device 150. In the EV mode, the engine 100 is stopped and the second electric motor 120 is preferentially used to generate vehicle drive power when the SOC of the electricity storage device 150 is greater than a predetermined value. In the HV mode, after the SOC is reduced to the predetermined value or less, the hybrid vehicle 1 travels using at least one of the engine 100 and second electric motor 120, and the first electric motor 110 generates electricity using drive power from the engine 100, so that the electricity storage device 150 is charged with the electricity thus generated. In the HV mode, the engine 100 and the second electric motor 120 are controlled so that the SOC is maintained within a predetermined range near the predetermined value.

The ECU 170 controls operations of the engine 100, first electric motor 110, and second electric motor 120, according to the driving mode. The ECU 170 also controls the charger 180. The ECU 170 may be divided into multiple ECUs for the respective functions.

According to control by the ECU 170, the charger 180 charges the electricity storage device 150 with electricity provided by an external power supply (not illustrated) based on a charging schedule. More specifically, electricity supplied from the external power supply is input to the charge inlet 190, and the charger 180 converts the voltage of the electricity into a predetermined charge voltage. The electricity of which the voltage is thus converted by the charger 180 is then supplied to the electricity storage device 150, which is charged accordingly. The charge inlet 190 is configured to be connectable with a charging cable connected to the external power supply and is a power interface for receiving electricity supplied from the external power supply.

The display device 200 is mounted within the vehicle cabin of the hybrid vehicle 1 and displays a charging schedule of the electricity storage device 150. The display device 200 may also have a car navigation function.

Figure 2:
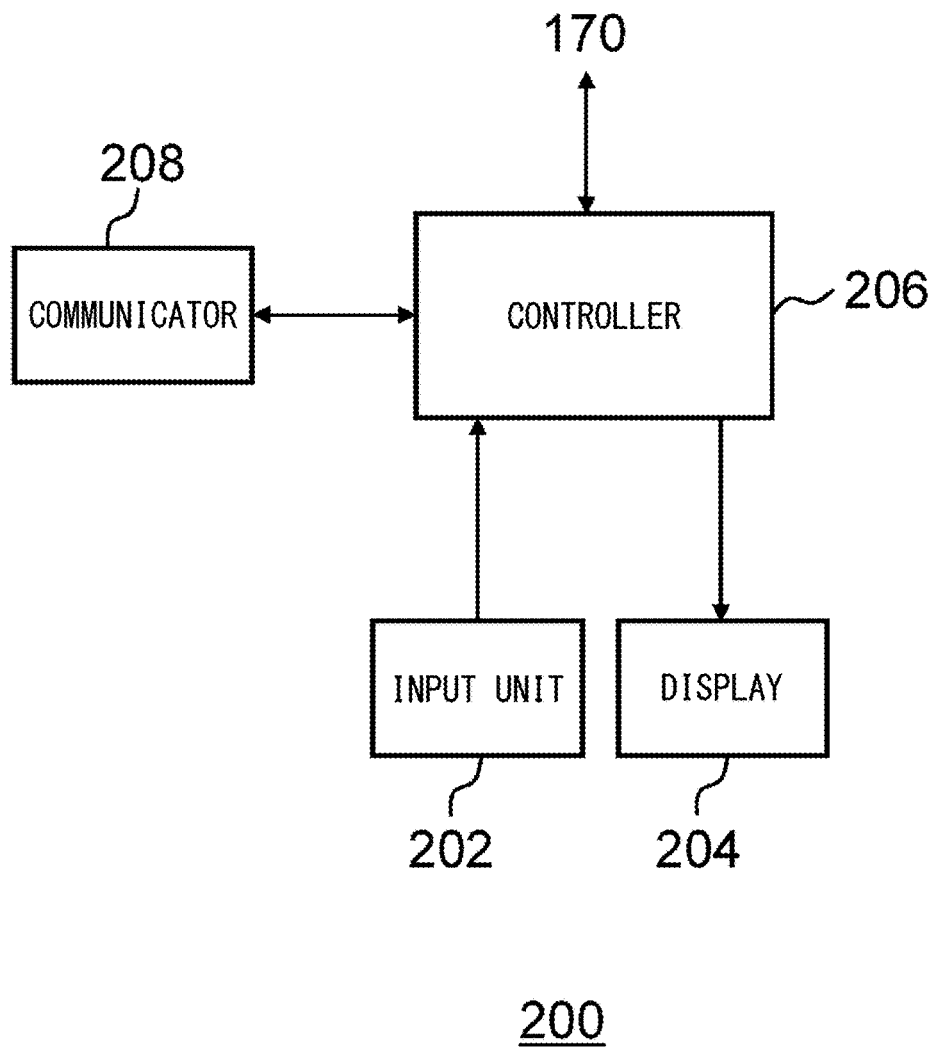
FIG. 2 is a block diagram that shows a schematic configuration of a display device shown in FIG. 1.

FIG. 2 is a block diagram that shows a schematic configuration of the display device 200 shown in FIG. 1. The display device 200 comprises an input unit 202, a display 204, a controller 206, and a communicator 208.

The input unit 202 inputs charging plans for multiple days according to a user's operation. For each of the charging plans for multiple days, a charging reservation type can be specified. The charging reservation types include a charging reservation with start time specified and a charging reservation with finish time specified, for example. The input unit 202 may include a touch panel, for example, and detect a touch position on the screen of the display 204 to input information according to the touch position. The information input by the input unit 202 is then transmitted to the controller 206.

The display 204 may include a liquid crystal display panel, for example, and displays various pieces of information including a charging schedule according to control by the controller 206.

The controller 206 stores information input by the input unit 202 and controls display on the display 204 based on the information. More specifically, the controller 206 displays a charging schedule of the electricity storage device 150 on the display 204, using multiple icons that represent charging plans for multiple days. Also, when multiple charging reservation types are specified for the charging plans for multiple days, the controller 206 displays icons on the display 204 so that at least one of shapes and colors of the icons are different for each charging reservation type. The controller 206 also sets the color of an icon representing the nearest charging plan from the current time to be different from the colors of icons representing the other charging plans. The display of a charging schedule will be detailed later.

The controller 206 controls the charger 180 according to a charging schedule. More specifically, at the date and time of a charging plan, the controller 206 provides a charging start instruction to the ECU 170. Upon reception of the charging start instruction, the ECU 170 allows the charger 180 to charge the electricity storage device 150.

The controller 206 includes a computer, and each of various functions of the controller 206 can be implemented by a circuit block, a memory, an LSI or the like in terms of hardware, and by a memory-loaded program or the like in terms of software. Accordingly, it will be obvious to those skilled in the art that the various functions of the controller 206 may be implemented in a variety of forms by hardware only, software only, or a combination thereof, and the form is not limited to any of them.

The communicator 208 acquires data of a charging schedule from the controller 206 and transmits the data to a communication device (not illustrated) provided outside the vehicle via wireless communication. Using a mobile device, such as a smartphone and a mobile phone, a user executes an application for displaying a charging schedule. Accordingly, the mobile device receives the data of the charging schedule from the external communication device via wireless communication and displays the charging schedule. Even when the user is not present in the hybrid vehicle 1, the user can check and change the charging schedule displayed on the mobile device. Accordingly, the mobile device transmits the data of the charging schedule thus changed to the external communication device via wireless communication. The communicator 208 receives the data of the changed charging schedule from the external communication device of the hybrid vehicle 1 via wireless communication and transmits the data to the controller 206. The controller 206 then changes the display on the display 204 according to the data of the changed charging schedule.

Figure 3:
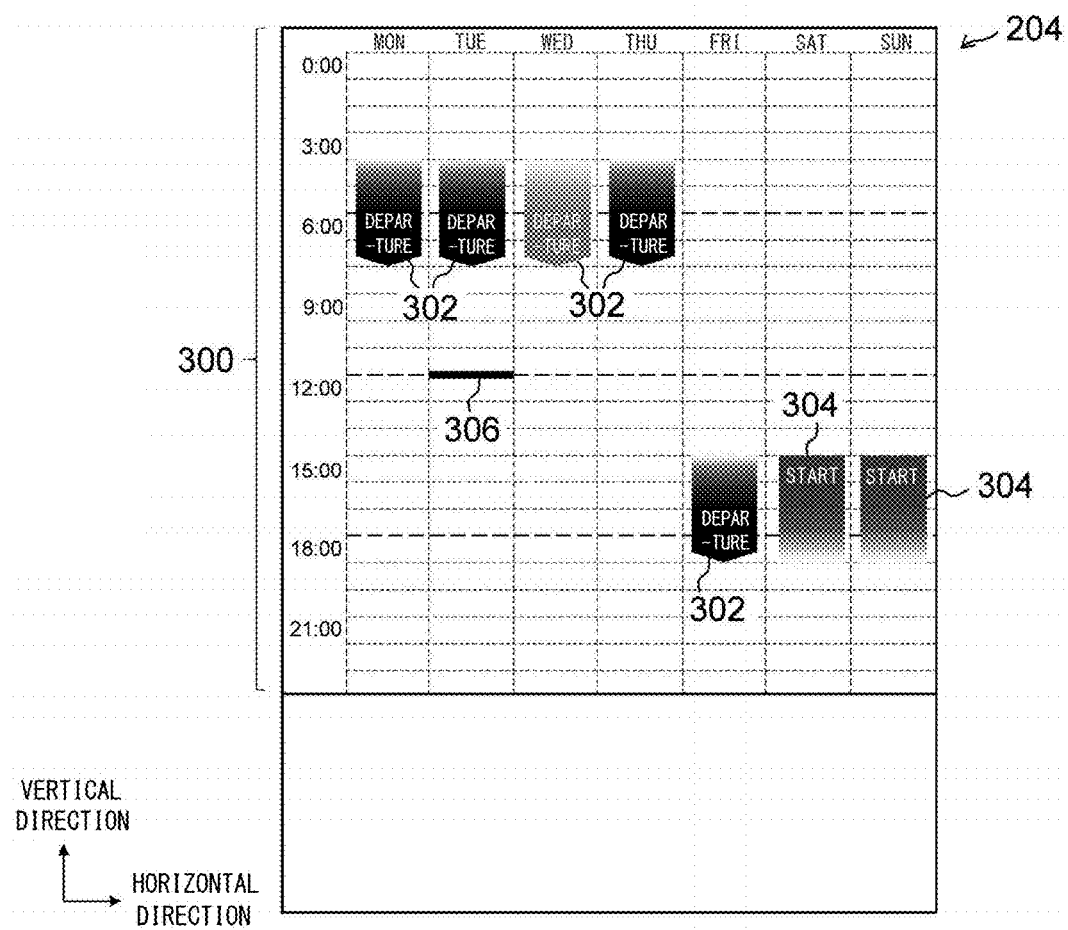
FIG. 3 is a diagram that shows a display state of a display shown in FIG. 2.

FIG. 3 is a diagram that shows a display state of the display 204 shown in FIG. 2. The screen of the display 204 includes a first display region 300 on which a charging schedule of the electricity storage device 150 is displayed. The first display region 300 is partitioned in a matrix in horizontal and vertical directions. In the example shown in FIG. 3, the first display region 300 is partitioned into 7 sections in the horizontal direction and into 24 sections in the vertical direction. The 7 sections in the horizontal direction of the first display region 300 correspond to Monday through Sunday, and the 24 sections in the vertical direction thereof correspond to 24 hours in each day. Namely, one section in the vertical direction represents one hour.

A charging schedule is displayed with first icons 302 and second icons 304, representing multiple charging plans, arranged on the first display region 300. A first icon 302 and a second icon 304 are different from each other in at least one of color and shape. In this example, a first icon 302 and a second icon 304 are different from each other in both the color and shape.

A first icon 302 corresponds to a charging reservation with finish time specified, i.e., a charging reservation with departure time specified. For example, a first icon 302 may be a pentagon colored in green (a first color) and having a home plate shape with a vertex at the bottom, and the color thereof may be lighter toward the upper side. Namely, the first icon 302 may be displayed with gradation. Upon the first icon 302, the word "DEPARTURE" is displayed.

A second icon 304 corresponds to a charging reservation with start time specified. For example, a second icon 304 may be a rectangle colored in blue (a second color), and the color thereof may be lighter toward the lower side. Namely, the second icon 304 may also be displayed with gradation. Upon the second icon 304, the word "START" is displayed.

Each of multiple first icons 302 and second icons 304 represents a charging plan. More specifically, the position in the horizontal direction of a first icon 302 indicates the day of the charging plan, the position of the upper end of the first icon 302 indicates tentative scheduled charging start time, and the position of the vertex at the bottom indicates scheduled charging finish time. Also, the position in the horizontal direction of a second icon 304 indicates the day of the charging plan, the position of the upper side of the second icon 304 indicates scheduled charging start time, and the position of the lower end thereof indicates tentative scheduled charging finish time.

On the first display region 300, a current time icon 306 that indicates the current day and time is also displayed. In the example shown in FIG. 3, the current time icon 306 indicates twelve noon on Tuesday. The current time icon 306 moves with time. The sections of the first display region 300 corresponding to the days and times before the current time icon 306 indicate the days and times in the following week.

There will now be described the operations of the display device 200 and the charging operations of the hybrid vehicle 1.

Since the hybrid vehicle 1 is a vehicle of which external charging is possible, by storing as much electricity as possible in the electricity storage device 150 after finishing driving, the travelable distance of the hybrid vehicle 1 using electricity stored in the electricity storage device 150 can be increased.

On the other hand, maintaining a high SOC state of a secondary battery used as the electricity storage device 150 for a long time is generally unfavorable in terms of performance degradation. Accordingly, when a charging reservation with finish time specified is selected as the charging reservation type, the controller 206 and the ECU 170 perform charging control (timer charging control) of the electricity storage device 150 so that the SOC becomes a full charge state right before the scheduled charging finish time set by a user.

A user inputs multiple charging plans in advance by providing touch operations on a setting screen, not illustrated, of the display 204.

When a charging reservation with finish time specified is selected as the charging reservation type, the controller 206 subtracts a predetermined expected maximum charging time, such as four hours, from scheduled charging finish time set in advance, so as to set the subtraction result as tentative scheduled charging start time. Accordingly, the position of the first icon 302 is determined.

The controller 206 displays, on the display 204, the first icon 302 representing the charging reservation with finish time specified so that the color of the tentative scheduled charging start time side of the first icon 302 is lighter than the color of the scheduled charging finish time side thereof. Accordingly, the user can intuitively understand that the first icon 302 represents a charging reservation with finish time specified.

A charging reservation with finish time specified may be set on a day in which scheduled departure time is fixed in advance, for example.

When a charging reservation with start time specified is selected as the charging reservation type, the controller 206 adds an expected maximum charging time to scheduled charging start time set in advance, so as to set the addition result as tentative scheduled charging finish time. Accordingly, the position of the second icon 304 is determined.

The controller 206 displays, on the display 204, the second icon 304 representing the charging reservation with start time specified so that the color of the tentative scheduled charging finish time side of the second icon 304 is lighter than the color of the scheduled charging start time side thereof. Accordingly, the user can intuitively understand that the second icon 304 represents a charging reservation with start time specified.

A charging reservation with start time specified may be set on a day in which scheduled departure time is not fixed but the user wishes to determine scheduled charging start time in advance, such as when the user wishes to charge the electricity storage device 150 during hours in which the electricity rate is less expensive, for example.

In the example shown in FIG. 3, the current time is twelve noon on Tuesday. The color of the first icon 302 on Wednesday, representing the nearest charging plan, may be orange (a third color), for example, which is different from the colors of the other first icons 302 and second icons 304. Accordingly, the user can easily recognize the nearest charging plan.

The user checks the first icon 302 or second icon 304 representing the nearest charging plan and connects the charge inlet 190 to an external power supply with a charging cable prior to the tentative scheduled charging start time indicated by the first icon 302 or the scheduled charging start time indicated by the second icon 304.

When the charging reservation type of the nearest charging plan is a charging reservation with finish time specified, the controller 206 computes the actual scheduled charging start time at the tentative scheduled charging start time. More specifically, based on the SOC of the electricity storage device 150 acquired from the ECU 170, the controller 206 computes a necessary charge amount required to charge the electricity storage device 150 to a full charge state. Based on the necessary charge amount thus obtained and the voltage of the external power supply, the controller 206 then computes the charging time. Thereafter, the controller 206 subtracts the charging time from the scheduled charging finish time, so as to set the subtraction result as the actual scheduled charging start time. Since the tentative scheduled charging start time is determined based on the expected maximum charging time, the actual scheduled charging start time will be the tentative scheduled charging start time or later.

At the actual scheduled charging start time, the controller 206 provides a notification to the ECU 170. According to the notification from the controller 206, the ECU 170 allows the charger 180 to charge the electricity storage device 150 with electricity from an external power supply. Accordingly, at the scheduled charging finish time set by the user, the SOC will be almost 100%, so that driving can be started at appropriate timing.

Meanwhile, when the charging reservation type of the nearest charging plan is a charging reservation with start time specified, the controller 206 provides a notification to the ECU 170 at the scheduled charging start time, so as to allow the charger 180 to charge the electricity storage device 150. After the charging for a charging time set according to the SOC of the electricity storage device 150 or the like, the SOC will be almost 100%.

Also, turning on or off of air conditioner operation may be set in relation to each of the first icons 302 and second icons 304. This setting is not displayed on the first icons 302 and second icons 304 but may be displayed thereon. When the air conditioner operation is set to be turned on, the air conditioner starts the operation a certain period of time before the scheduled charging finish time.

If the charge inlet 190 is not connected to an external power supply with a charging cable at scheduled charging start time, for example, charging is not performed. In this case, the ECU 170 provides a notification to the controller 206, which then displays the fact of the unchargeable state on the display 204.

There will now be described changing a charging schedule.

Figure 4:
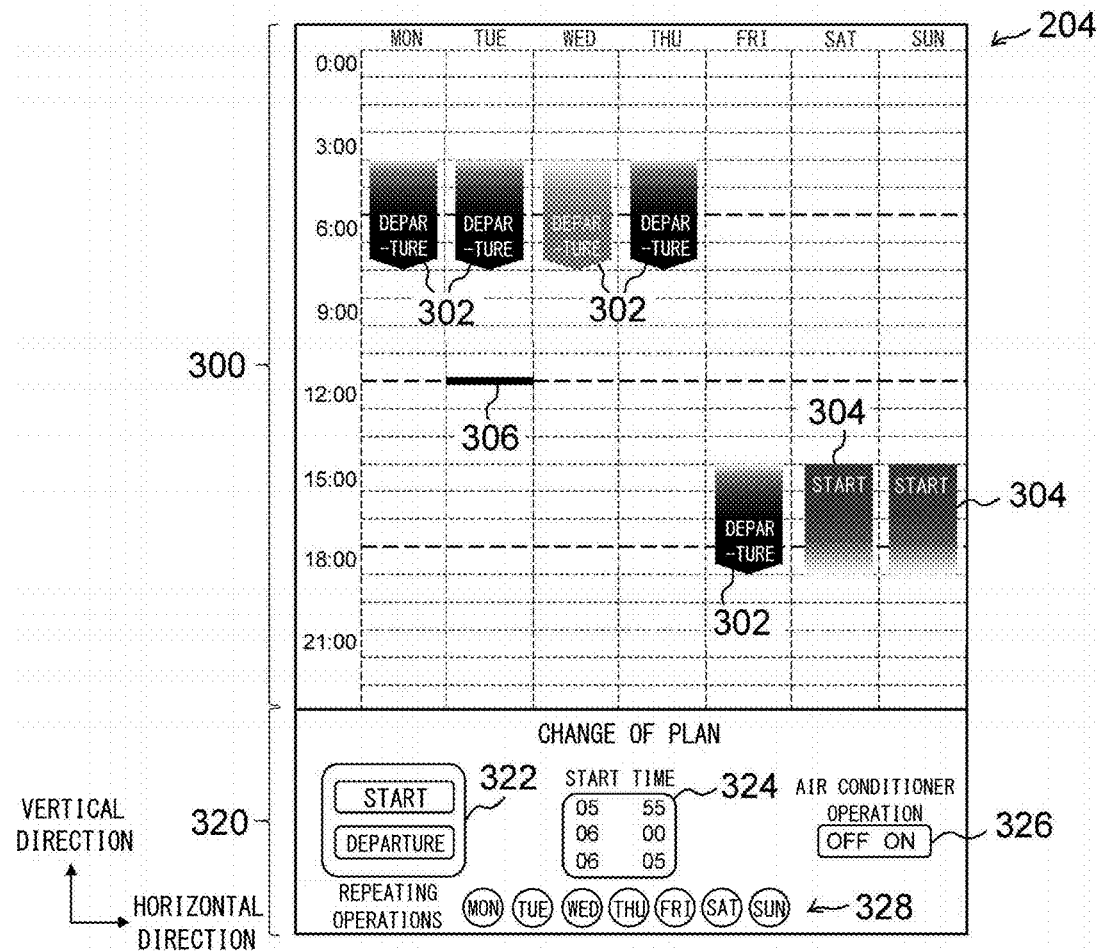
FIG. 4 is a diagram that shows a display state of the display shown in FIG. 2 when a charging schedule is changed.

FIG. 4 is a diagram that shows a display state of the display 204 shown in FIG. 2 when a charging schedule is changed. When a desired first icon 302 or second icon 304 is touched, multiple setting icons are displayed on a second display region 320 below the first display region 300, as shown in FIG. 4. In this example, the first icon 302 on Friday is touched.

On the second display region 320, a first setting icon 322 used to select the charging reservation type, a second setting icon 324 used to set the time, a third setting icon 326 used to select the turning on or off of the air conditioner operation, and a fourth setting icon 328 used to set repeating operations are displayed.

The user can change the charging plan of the first icon 302 on Friday by touching the first setting icon 322 and the like. For example, if the charging reservation with start time specified is selected as the charging reservation type on the first setting icon 322, the time specified on the second setting icon 324 will be set as the scheduled charging start time. Also, if Friday is selected on the fourth setting icon 328, the time of the charging plan on every Friday will be changed.

Further, by touching a next plan changing icon, not illustrated, before touching a desired first icon 302 or second icon 304, the next charging plan can be changed. In this case, the same setting icons as shown in FIG. 4 are displayed. For example, if the first icon 302 on Friday is touched, the next charging plan will be the charging plan on Friday. Accordingly, the color of the first icon 302 on Friday will be changed to orange. Since the next charging plan is on Friday, the charging on Wednesday and Thursday is not performed. The time of the charging plan on Friday represented by the touched first icon 302 can also be changed. In this way, the next charging plan can be changed with easy operation.

Thus, according to the present embodiment, since a first icon 302 and a second icon 304 for the respective charging reservation types are displayed to be different from each other in at least one of color and shape, even if a charging schedule of charging plans for multiple days is displayed, the charging reservation type set to each charging plan can be intuitively understood. Accordingly, changing the day or time of a specific charging plan or checking if a charging schedule of charging plans for multiple days is correctly set can be performed more easily. Therefore, charging of the hybrid vehicle 1 can be appropriately performed at the user's convenience.

Also, since the color of a first icon 302 or second icon 304 representing the nearest charging plan from the current time is changed to a color different from the colors of first icons 302 and second icons 304 representing the other charging plans, the nearest charging plan can be easily recognized.

Further, since a charging reservation with start time specified or a charging reservation with finish time specified can be set as the charging reservation type, a charging schedule convenient to the user can be set.

Described above is an explanation based on exemplary embodiments. The embodiment is intended to be illustrative only, and it will be obvious to those skilled in the art that various modifications to a combination of constituting elements or processes could be developed and that such modifications also fall within the scope of the present disclosure.

For example, although the aforementioned embodiment describes the hybrid vehicle 1, the vehicle may be an electric vehicle with no engine.

Also, although the embodiment describes the example in which the input unit 202 includes a touch panel and detects a touch position on the screen of the display 204, the input unit 202 may include a switch of hardware. By operating the switch, the user can set a charging plan, for example.

What is claimed is:

1. A display device, comprising:
a display configured to display a charging schedule of an electricity storage device, using a plurality of icons representing charging plans for a plurality of days; and
a controller configured to display the icons on the display, when a plurality of different charging reservation types are specified for the charging plans for the plurality of days, the different charging reservation types including (1) a charging reservation with start time specified by a user and (2) a charging reservation with finish time specified by the user, so that at least one of a shape and a color of the icon for the charging reservation with start time specified by the user is different from at least one of the shape and the color of the icon for the charging reservation with finish time specified by the user.

2. The display device of claim 1, wherein the controller sets the color of an icon representing the nearest charging plan from the current time to be different from the colors of icons representing the other charging plans.

3. The display device of claim 1, wherein:
when the charging reservation with start time specified by the user is selected as the charging reservation type, the controller adds a predetermined expected maximum charging time to a scheduled charging start time set in advance, so as to set a tentative scheduled charging finish time;
when the charging reservation with finish time specified by the user is selected as the charging reservation type, the controller subtracts the predetermined expected maximum charging time from a scheduled charging finish time set in advance, so as to set a tentative scheduled charging start time;
the controller displays, on the display, an icon representing the charging reservation with start time specified by the user so that the color of the tentative scheduled charging finish time side of the icon is lighter than the color of the scheduled charging start time side of the icon; and
the controller displays, on the display, an icon representing the charging reservation with finish time specified by the user so that the color of the tentative scheduled charging start time side of the icon is lighter than the color of the scheduled charging finish time side of the icon.

4. The display device of claim 1, wherein:
the display device is mounted on a vehicle having (i) an electric motor for generating vehicle drive power, (ii) the electricity storage device which stores electricity used to drive the electric motor, and (iii) a charger for charging the electricity storage device using electricity from an external power supply that is external of the vehicle; and
the controller controls the charger according to the charging schedule.

5. The display device of claim 1, wherein:
the controller displays the icons on the display so that an external shape of the icon for the charging reservation with start time specified by the user is different from the external shape of the icon for the charging reservation with finish time specified by the user.

6. The display device of claim 5, wherein:
the controller displays the icons on the display so that the color of the icon for the charging reservation with start time specified by the user is different from the color of the icon for the charging reservation with finish time specified by the user.

7. The display device of claim 1, wherein:
the controller displays the icons on the display so that the color of the icon for the charging reservation with start time specified by the user is different from the color of the icon for the charging reservation with finish time specified by the user.

8. A display device, comprising:
a display configured to display a charging schedule of an electricity storage device, using a plurality of icons representing charging plans for a plurality of days; and
a controller configured to display the icons on the display, when a plurality of different charging reservation types are specified for the charging plans for the plurality of days, the different charging reservation types including (1) a charging reservation with start time specified by a user and (2) a charging reservation with finish time specified by the user, so that at least one of a shape and a color of the icon for the charging reservation with start time specified by the user is different from at least one of the shape and the color of the icon for the charging reservation with finish time specified by the user, wherein:
when the charging reservation with start time specified by the user is selected as the charging reservation type, the controller sets a tentative scheduled charging finish time to the charging plan;
when the charging reservation with finish time specified by the user is selected as the charging reservation type, the controller sets a tentative scheduled charging start time to the charging plan;
the controller displays, on the display, an icon representing the charging reservation with start time specified by the user so that the color of the tentative scheduled charging finish time side of the icon is lighter than the color of the scheduled charging start time side of the icon; and
the controller displays, on the display, an icon representing the charging reservation with finish time specified by the user so that the color of the tentative scheduled charging start time side of the icon is lighter than the color of the scheduled charging finish time side of the icon.

9. The display device of claim 8, wherein the controller sets the color of an icon representing the nearest charging plan from the current time to be different from the colors of icons representing the other charging plans.

10. The display device of claim 8, wherein:
the display device is mounted on a vehicle having (i) an electric motor for generating vehicle drive power, (ii) the electricity storage device which stores electricity used to drive the electric motor, and (iii) a charger for charging the electricity storage device using electricity from an external power supply that is external of the vehicle; and
the controller controls the charger according to the charging schedule.

11. The display device of claim 8, wherein:
the controller displays the icons on the display so that an external shape of the icon for the charging reservation with start time specified by the user is different from the external shape of the icon for the charging reservation with finish time specified by the user.

12. The display device of claim 11, wherein:
the controller displays the icons on the display so that the color of the icon for the charging reservation with start time specified by the user is different from the color of the icon for the charging reservation with finish time specified by the user.

13. The display device of claim 8, wherein:
the controller displays the icons on the display so that the color of the icon for the charging reservation with start time specified by the user is different from the color of the icon for the charging reservation with finish time specified by the user.

* * * * *